United States Patent [19]
Gleeson

[11] Patent Number: 6,134,824
[45] Date of Patent: Oct. 24, 2000

[54] USE OF ELECTRIC FIELDS TO DIRECT FISH MOVEMENT

[76] Inventor: Lawrence Gleeson, P.O. Box 402, Belfast, Me. 04915

[21] Appl. No.: 09/065,560

[22] Filed: Apr. 24, 1998

Related U.S. Application Data

[60] Provisional application No. 60/044,274, Apr. 25, 1997.

[51] Int. Cl.[7] .......................... A01K 79/02; A01K 97/05
[52] U.S. Cl. .................................. 43/17.1; 43/55
[58] Field of Search .................. 43/17.1, 55, 56; 119/219, 220

[56] References Cited

U.S. PATENT DOCUMENTS

| | | | |
|---|---|---|---|
| 1,515,547 | 11/1924 | Burkey | 43/17.1 |
| 1,974,444 | 9/1934 | Burkey | 43/17.1 |
| 2,010,601 | 8/1935 | Loughridge | 43/17.1 |
| 2,233,045 | 2/1941 | Bonner | 43/17.1 |
| 2,605,742 | 8/1952 | Burkey | 43/17.1 |
| 2,612,861 | 10/1952 | Burkey | 43/17.1 |
| 2,709,984 | 6/1955 | Marks | 43/17.1 |
| 2,778,140 | 1/1957 | Applegate | 43/17.1 |
| 2,913,846 | 11/1959 | Mclain | 43/17.1 |
| 3,069,797 | 12/1962 | Kreutzer | 43/17.1 |
| 3,369,318 | 2/1968 | Kreutzer | 43/17.1 |
| 4,750,451 | 6/1988 | Smith | 119/3 |
| 4,825,810 | 5/1989 | Sharber | 43/17.1 |

OTHER PUBLICATIONS

Medcof, "Incidental Records on Behaviour of Eels in Lake Ainslie, Nova Scotia," Journal Fisheries Research Board of Canada, vol. 23 (No. 7), p. 1101–1105, (1966).

Rommel, Jr., et al., "Sensitivity of American Eels and Atlantic Salmon to Weak Electric and Magnetic Fields," Journal Fisheries Research Board of Canada, vol. 30 (No. 5), p. 657–663, (1973).

McCleave, et al., "Effect of Reinforcement Schedule and Unconditioned Stimulus on Classical Cardiac Conditioning in American Eels," Journal Fisheries Research Board of Canada, vol. 31 (No. 7), p. 1254–1258, (1974).

Smith–Root, Inc., "Smith–Root's General Catalog," (Jan., 1997).

*Primary Examiner*—Kurt Rowan
*Attorney, Agent, or Firm*—Jones, Tullar & Cooper, PC

[57] ABSTRACT

Low level electric fields are employed to direct fish movements without stunning or injuring the fish. The fields are generated by applying an electrical potential of no more than 25 volts to a wire submerged in a body of water containing the fish to be directed. In a first embodiment, the wire is disposed along the spillway of a dam, and directs fish, such as eels, away from the spillway, and toward an area of desired egress. A second embodiment is employed to contain fish or eels within a protective body of water, such as an open containment vessel, and utilizes a field generating wire positioned along the upper inner wall of the vessel.

8 Claims, 4 Drawing Sheets

FIELD ENERGIZER
BLOCK DIAGRAM

USE OF ELECTRIC FIELDS TO DIRECT FISH MOVEMENT

This application claims benefit of provisional application Ser. No. 60/044,274 filed Apr. 25, 1997.

BACKGROUND OF THE INVENTION

The present invention relates in general to the use of low level electric fields to control movement of fish.

In the operation of a hydro-electric plant, in which a dam is constructed across a river or stream to facilitate generation of electricity with water driven turbines, a problem is often presented with respect to the fish and other aquatic life in the river or stream. In particular, fish are frequently killed or injured by being swept over a dam's spillway, or into the turbines. In addition, the turbines can be damaged if fish are ingested into them, especially in the case of smaller turbines and large fish, such as eels. Numerous attempts have therefore been made to prevent fish from approaching these off-limits areas.

In an effort to solve the foregoing problem without the need for costly, difficult to maintain physical barriers, the inventor experimented with the use of electric field barriers in a river, other bodies of water and other hydraulic works associated with hydroelectric power projects which prevent the fish from approaching off-limits areas by subjecting them to stun-inducing electric shocks. While certainly effective at stopping the fish from swimming, this technique proved to be less than desirable for two reasons. First, because the stunned fish can not swim until they recover, only the water currents in the river or stream will determine the path of their movement once they are stunned. If the area being protected is a turbine intake at a hydro-electric plant, this likely means that the stunned fish will be swept directly into the intake, thereby completely defeating the purpose of the electric field barrier. Second, the likelihood that the fish will be permanently injured by being stunned in this manner is substantial. In particular, examinations of fish exposed to stun-inducing fields which appeared to have recovered from being stunned, confirmed that many of the fish were found to have sustained permanent skeletal damage.

SUMMARY OF THE INVENTION

Through continued experimentation with electric field barriers, the inventor made the surprising discovery that fish can be repelled by using low level electric fields that neither stun the fish, nor appear to have any other deleterious effect on them. As a result, the fish can still swim after being exposed to the low level fields, and can thereby be encouraged to swim in a desired direction, irrespective of the water current direction in the river or stream. In addition, the use of low level electric fields substantially reduces the likelihood that the fish will be injured thereby.

The present invention is a result of experiments with migratory eels, a fish that presents a particular problem at dams located on rivers or streams in New England which feed into the Atlantic Ocean. During these experiments, it was discovered that eel movement can be reliably controlled through application of voltages which are substantially less than stun-inducing voltages of approximately 40 volts or more as employed in the inventor's previous experiments. More particularly, it was discovered that the majority of eels tend to swim away from the area at which a low level electric field is generated with an applied voltage of as low as approximately 6 volts. This behavior was observed in spite of the fact that there was no indication that the eels were being stunned. As a result, using low level voltages on the order of approximately 6–25 volts, the eels can be "encouraged" to swim toward a desired location through proper positioning of field inducing wires or rods in the water. In addition, this technique can also be employed in a perimeter barrier for confining fish within a protective body of water, such as a tank or pond.

To implement the method of the present invention, a single exposed conductor wire, referred to as a training wire, is positioned in the river, stream, pond, tank or other body of water at the location from where it is desired that the fish be repelled. A low voltage of no greater than 25 volts, and preferably 6–25 volts, is applied between the conductor and ground using any suitable type of adjustable power supply. The minimum voltage within the 6–25 volt range which effects the desired fish movement control without stunning is selected as the upper voltage limit, and will differ, depending on the installation site specific conditions. This generates an electric field in the water near the wire that is sufficient to repel approaching eels and other fish without stunning them, but does not extend an unnecessary distance from the training wire.

A first preferred embodiment of the invention is specifically designed to guide eels away from a dam spillway, and thereby reduce the likelihood that they will pass over the spillway crest and be injured. In this embodiment, the wire is positioned approximately one foot from the spillway along all but a desired egress portion of its length. This guides the eels toward the desired egress portion of the spillway where provisions are made for either catching the eels in a trap, or guiding them to a soft landing area beneath the spillway. In this embodiment, a voltage as low as 12 volts is found to be effective at repelling or guiding the eels away from danger.

In a second preferred embodiment that is designed specifically for containing eels within a protective perimeter about a body of water, such as a tank, the wire is positioned approximately 1 inch below the water surface, and 1 inch inside the perimeter of an overflowing, open-topped vessel. This guides the eels away from the wire and to the inside of the protective perimeter where the eels may be kept on a long term basis. Absent such confinement, adult eels will rapidly depart a tank, as they can readily clear even a 12 inch barrier, and move across dry land.

The preferred embodiments also includes safety precautions to insure that the generated fields will not pose a danger to animals or people who may accidently come in contact with the water or wire. In particular, the field generating power supply is preferably of the current limiting type so that the current level cannot increase to a potentially dangerous level, and the output voltage will automatically be reduced if the electrical resistance of the water drops, such as may occur if an eel's body comes in contact with the wire, and creates a short circuit.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF THE PREFERRED EMBODIMENTS

Figure 1:
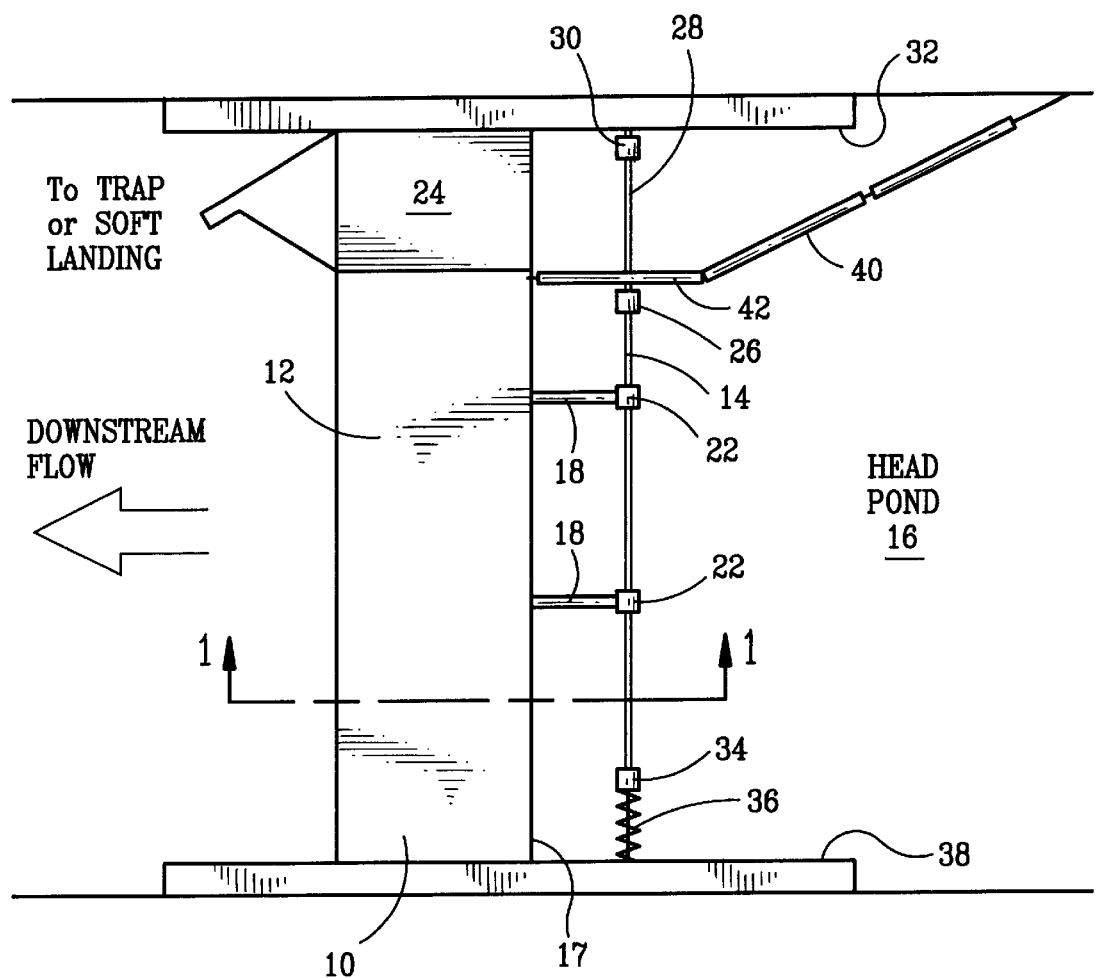
FIG. 1 is a top plan view of a dam at which an electric field generating system has been installed in accordance with a first preferred embodiment of the present invention.
Figure 2:
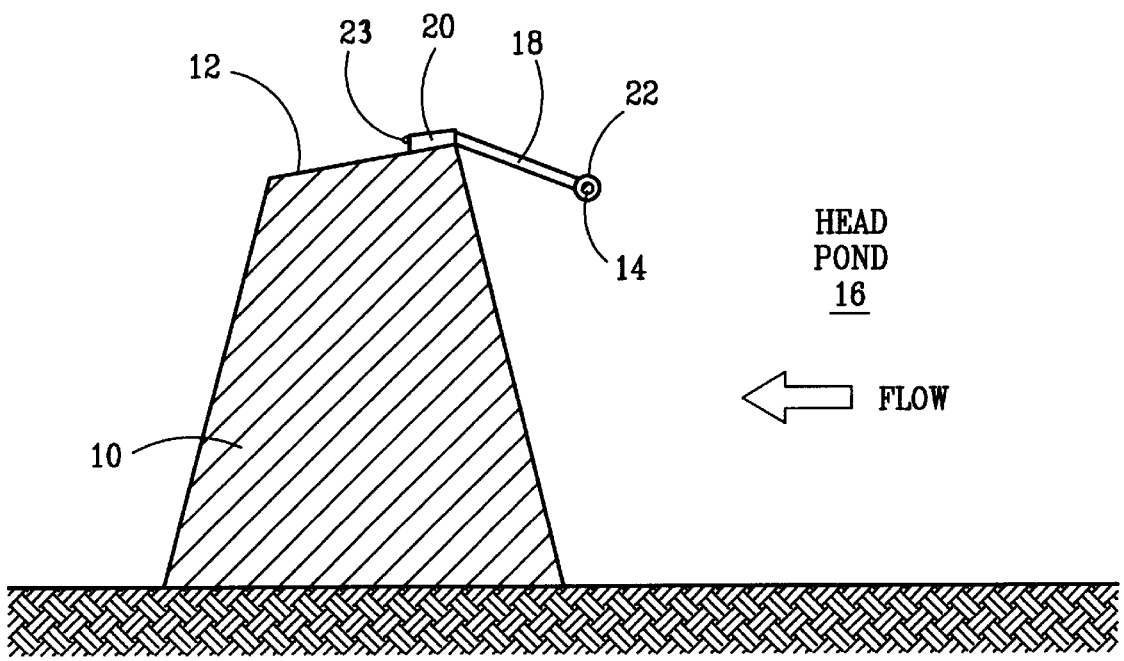
FIG. 2 is a section taken along line 1—1 of FIG. 1.

The first preferred embodiment of the invention is specifically designed to control movement of eels in the vicinity of a dam. Without any guidance, downstream migrating eels would be expected to cross over a spillway crest of a dam at generally unpredictable locations along its length; the objective of the first preferred embodiment is to direct the eels to a desired egress at the right end of the spillway through the use of an electric field. FIGS. 1 and 2 illustrate a dam 10 including a spillway 12, from which it is desired that eels and other fish be repelled. In accordance with the first preferred embodiment of the invention, a training wire segment 14 is positioned parallel to the spillway 12 in a head pond 16. The training wire segment 14 is preferably an non-insulated conductor which is electrically connected to one side of a power supply as discussed in detail in conjunction with FIG. 3.

The training wire segment 14 is held in position approximately 1 foot from the pond-side top edge 17 of the spillway 12 by means of a plurality of insulating (e.g., fiberglass) rods or dowels 18, each of which is connected at a first end to the spillway 12 using a nailing block 20, or other suitable attachment means. A second end of each of the rods or dowels 18 is attached to a corresponding one of a plurality of pass through insulators 22, through which the training wire segment 14 passes. As illustrated in FIG. 2, the training wire segment 14 is preferably positioned several inches below the water level in the head pond 16 so that when the wire segment 14 is energized, the resulting field will discourage eels and other fish from passing over the spillway 12. A ground cable or wire 23 is attached to the nailing block as illustrated in FIG. 2.

The charged training wire segment 14 can be considered as enclosed in a nested set of closed cylindrical equal potential surfaces with the wire running down the middle. For example: if the surface of the wire segment 14 itself is taken as the reference (with the potential of every point relative to every other on the surface of the wire assumed to be 0) then all the points, at which a potential relative to a wire of 1.0 volt exists, would describe a cylindrical surface surrounding the wire which would not touch but which would lie outside of similar equal potential surfaces described by the locations of all the points of less than 1.0 volts potential, one such example being the cylinder described by all the points of 0.5 volts potential. Points of specific potentials greater than 1.0 volts would describe specific cylinders, each completely enclosing all cylinders described by all points of lesser potential, such as those of 1.0 volts, 0.5 volts and the surface of the wire itself, the reference, at 0.0 volts.

By definition, exposure to the highest potential gradients would occur in movements along lines which generally approach or move away from the training wire segment 14 in the direction of greatest rate of change of field potential, i.e. where the equal potential surfaces are bent closest towards the training wire segment 14 and the most are crossed in the shortest distance. In grounded single wire systems, this was observed to occur generally along lines from a point on the training wire segment 14 towards the closer points on the surface of the nearest, most conductive object, bonded most perfectly to ground for example, towards: a grounded steel trash rack, a reinforced concrete test tank floor/wall, a spillway crest, or, to a lessor degree, a muddy river bed. Such lines tend to lie perpendicular to the direction of the training wire segment 14. Exposure to the lowest gradients occurs in movement along lines on an equal potential surface, such as crossing a river on the face of a dam with a training wire located upstream and parallel to a dam's face. Such lines tend to be parallel to the training wire's direction.

Disposed along the right side (facing downstream) of the dam 10 is a desired egress area 24 which is positioned away from the treacherous portions of the spillway 12 and/or the water intake to the dam's turbines (not shown). The desired egress area leads to either a trap for catching the eels or other fish, or a soft landing area at the downstream foot of the dam 10 which allows the eels to pass over the dam 10 unharmed. Although it appears in FIG. 1 that the training wire segment 14 continues in front of the desired egress area 24, the training wire segment 14 actually terminates at a first insulator 26 before the desired egress area 24. A second, non-energized wire segment 28 is secured between the first insulator 26 and a second insulator 30 that is connected to a right side abutment 32 of the dam 10. At the opposite side of the dam 10, a third insulator 34 is disposed between the training wire segment 14 and a spring tensioning device 36 that is attached to a left side abutment 38 of the dam 10. The tensioning device 36 helps maintain the training wire segment 14 at the proper depth in the water by preventing it from sagging between the support dowels 18, and helping it recover from interaction with drifting debris.

A floating log boom 40 is also positioned upstream of the desired egress area 24 which prevents floating debris from entering this area by deflecting the debris toward the main portion of the spillway 12. A conductive ground screen 42 is attached to one leg of the log boom 40 that abuts the spillway 12, and is disposed perpendicular to the training wire segment 14 along the left side of the desired egress area 24. The ground screen 42 acts as a field delimiter, and insures that the electric field generated by the training wire segment14 will not continue in front of the desired egress area 24.

Figure 3:
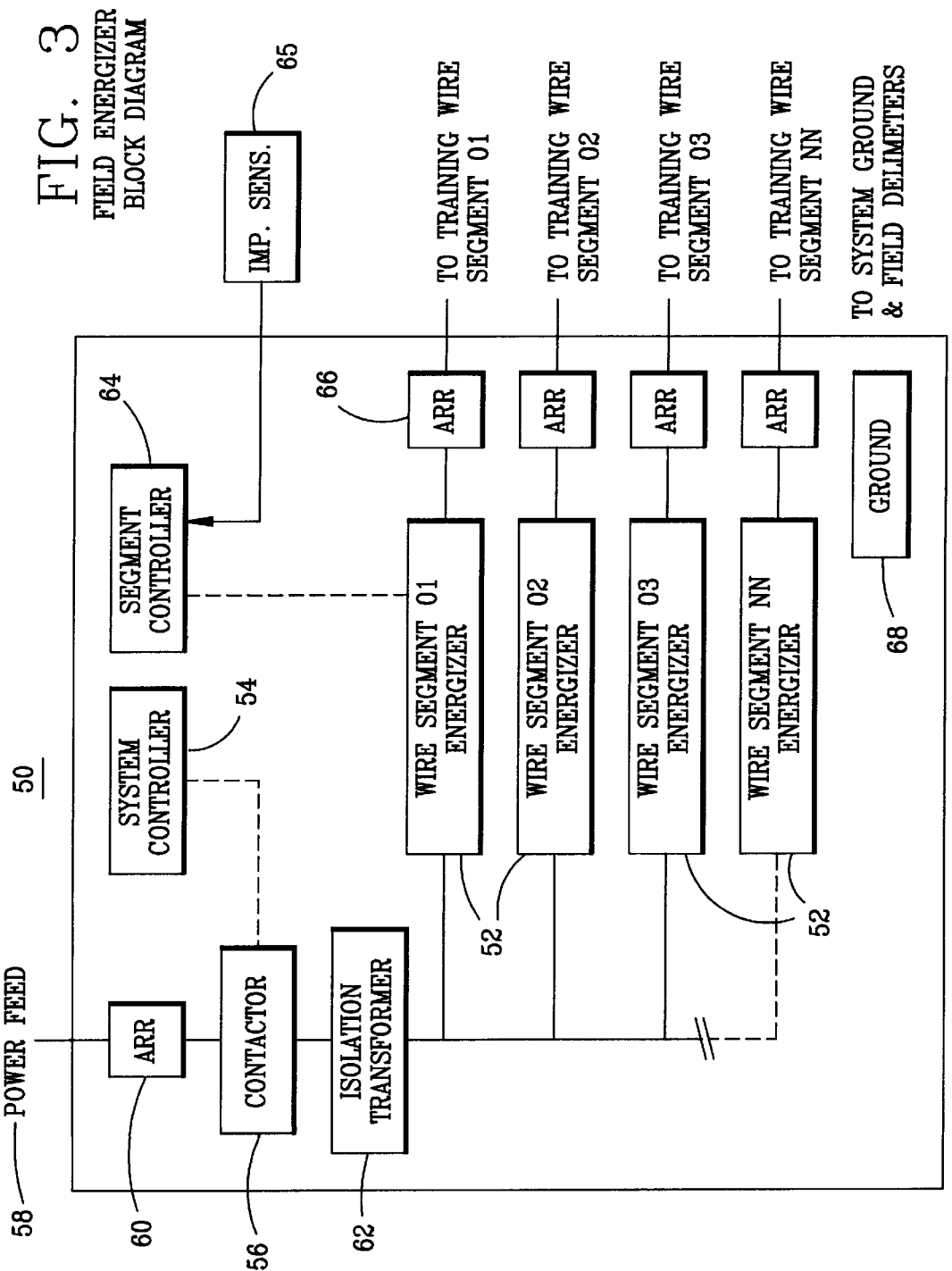
FIG. 3 is a schematic block diagram of a field generating power supply that is employed in the preferred embodiment.

Turning now to FIG. 3, a field energizer circuit 50 is illustrated which is employed to apply a field energizing potential to a plurality of training wire segments, such as the training wire segment 14 shown in FIGS. 1 and 2. The energizer circuit 50 includes a plurality of wire segment energizers 52, one for each training wire segment to be energized. Preferably, each of the energizers comprises an individually programmable current/voltage limiting power supply with a maximum voltage of 40 volts AC or DC, and a maximum current of 500 ma. Each power supply is preferably set to limit current to the ambient leakage rate observed at the setting potential. If the current is limited, the voltage will be reduced in response to a condition causing a temporary drop in resistance between the training wire segment and ground. The use of current limiting power supplies is therefore preferred since they inherently provide safety protection by insuring that the current will not increase to a dangerous level in the event that the water's impedance drops unexpectedly, or a short circuit occurs. Both a 60 Hertz AC and a DC system are effective, but use of AC avoids the electrolysis effects noted with DC and eels appear to be more sensitive to the fluctuating AC induced field. With DC, a negative polarity of the training wire segment relative to earth was favored by site electrolytic conditions.

Through use of plural energizers 52, a plurality of training wire segments can be energized with the same or different potentials to accommodate different physical arrangements of training wire segments. Thus, for example, if it is desired that eels or other fish also be repelled from the desired egress area 24 for some reason, then the second wire segment 28 can also be energized with one of the energizers 52.

A system controller 54 controls actuation of a contactor switch 56 which selectively applies power from a power feed 58 (e.g., 110 VAC) through a first lightening arrestor and surge protector 60, and an isolation transformer 62, to each of the energizers 52. The energizers 52 are each individually controlled by a segment controller 64. The segment controller 64 may also receive an input from a water impedance sensor 65 to provide precise voltage control so that minor impedance variations can be accommodated by the system. Both the system and segment controllers 54 and 64 may be embodied by a single microprocessor-based controller if desired. Due to the sensitivity of the system to the frequent occurrences of storm induced electrical transients, the output from each of the energizers 52 is fed through another corresponding lightening arrestor and surge protector 66 to the training wire segment to be energized. Finally, a ground connection 68 is provided for connecting the energizer circuit 50 to one or more grounding elements, such as the ground cable 23 and ground screen 42 of the first preferred embodiment.

In experiments with the first preferred embodiment, a range of electric potentials from 0.7–40 volts were applied across the training wire segment 14 and the grounding elements, including the ground cable 23 and the ground screen 42. The experiments resulted in the following observations and conclusions.

If an eel senses a potential gradient over a certain range, it will respond to avoid or withdraw from its effect. An eel directly approaching the charged training wire 14 and parallel spillway crest encounters a field of increasing intensity except at the location of the desired egress 24. It will attempt to avoid or withdraw from the effects of an electric field when the potential gradient it encounters reaches or exceeds an avoidance threshold; providing also that the gradient remains insufficient to stun the eel completely. Avoidance can have two courses, the eel can retreat and return to try again or it can move generally parallel to the training wire segment 14, crossing the upstream dam face either towards the desired egress 24 or away from it. As eels are persistent, unless it finds a new exit, it will find the desired egress 24 and the objective will be achieved.

If eels are observed to "crash the field", such as in undertaking a second, successful, high speed approach following a retreat from a previous encounter, an adjustment to increase the potential gradient is indicated. This is accomplished either by increasing the potential of the training wire segment 14, or by altering the field geometry.

Potentials of greater than 30 volts were found to be dangerous and of little value. With the training wire segment 14 under a potential of 40 volts, "severe" stunning of eels was observed.

Most eels will be first observed approaching the crest of the dam 10 from upstream and below the training wire segment 14. Their approach will expose them to an increasing potential gradient, this is most rapid under an approach angle of 90 degrees to the direction of the wire, lowest as the approach angle to the wire shallows to 0 degrees (parallel to the wire).

At some point on closing the distance to the wire and crest, the eels will respond to the increasing field intensity by quickly dropping to a lower elevation to avoid it or by turning towards a heading parallel to the wire, and then either follow an equal potential path across the upstream face of the dam 10 (or its intersection with the stream bed) or attempt to crash the field again, sometimes at a noticeably higher speed.

If an eel's approach momentum is sufficiently direct and rapid, or if it alters its approach angle from shallow to more direct, it may become partially stunned before an escape can be effected. The unstunned portion of the eel may be observed to effect a downwards escape for the entire eel, with apparently complete recovery and resumption of more orderly movement generally within a few seconds.

An occasional, extremely persistent individual can become completely stunned, even at 25 volts. As eels are more dense than the fresh water they will sink after being stunned. As long as the eel sink rate exceeds the uplift effect of the currents present, it will move in a useful direction until it recovers. It is clear, however, that the complete stunning of the eels should be avoided to prevent injury, and allow them to keep moving under their own power. At the intended egress 24, the eels rise under the uncharged cable segment, and effect their crossing of the spillway crest.

No eel was observed to successfully crash a field established by a properly rigged and charged training wire. The supplementary grounding cable 23 was found to be helpful in overcoming local variances in grounding condition. The cable 23 also serves to eliminate possible exposure to stray currents on the portion of the spillway 12 downstream of the cable.

Eels were previously observed to initially react to avoid a low intensity field (up through approximately 6 volts DC @8") upon its being energized, then, with the field held constant, some "braver" eels would tentatively approach the pole representing the most localized charge source, the balance tending to keep some distance away over the short period of observation. (Two separate test arrangements, the first with two short uninsulated wire segments @8" separation, the second with a single uninsulated wire segment located approximately 8" from a grounded surface, were employed.) Approach was more consistent when the field was energized to a lower, 3 volt potential. With respect to approaching or staying away, while there was a clear difference between the individuals at each test, no attempt was made to mark individuals to check for individual consistency between tests, i.e. is a brave eel always brave?

By improving resolution of exposure to potential gradients over a range of from 0.7 volts to approximately 40 volts, DC and AC (60 Hz), more useful responses which were observed. These responses were: 1—An initial quick avoidance response to a potential gradient (such as when the field is first charged or upon an initial rapid approach by the eel); 2—An apparent awareness of an existing potential gradient; 3—An ability to override the avoidance response at lower potentials, i.e., through a maximum of 3–6 volts; and lastly; 4—The "go limp" stun "response". It was observed that the onset of the stun response occurs over a potential range of from about 12 volts through 25 volts. Exposure at above 30 volts will leave few, if any, unaffected. Response appears to vary between individuals, with onset of stunning at lower potentials in some instances following recovery from a recent similar experience (successive events observed within a "few" minutes). It was also observed that the stun response is not an all or nothing condition, a characteristic which is useful for design purposes. The eel may be "partial stunned"; with a portion of its length being in a limp condition while the balance being in an active condition. The stun recovery appears to be related to the extent (potential magnitude and duration) of exposure and appears to differ between individuals. The usual avoidance reaction upon an eel's actual contact with an electrode was observed to become less reliable at lower potentials. For example, at less than about 1.5 volts, some individuals were observed to directly, "carefully" approach, make contact with and displace an electrode while exhibiting no outward sign of discomfort, much less making an attempting to avoid the charge.

Eel response time, inertia, flow velocity, eel size and the rate of change of the potential gradient are also considerations. Examples were observed of eel approach at high velocity with a direction of movement likely to expose it to a sudden gradient increase. In several instances, the eel's response was insufficient to successfully effect avoidance prior to being rendered helpless once the threshold of the stun response was reached. Larger eels appeared more vulnerable to this effect, possibly due to their length and consequential full body exposure to a greater charge differential than smaller eels or possibly, due to a shallower avoidance acceleration curve. Unless larger eels are capable of developing a higher peak power output per unit of body mass than a smaller eel over the same time interval or the nerve impulses of larger eels travel at a faster rate, the assumption of differing acceleration curves appears reasonable.

Given the foregoing, the conclusion reached from the experiments was that control of movement of free swimming eels through use of electric fields would require their exposure to a potential gradient which remains below the threshold at which the complete stunning response is triggered but above the limit of the eel's capability to countermeasure. The eel must remain sufficiently aware of the training device in order to actively avoid it. In the first preferred embodiment, it was therefore determined that the applied voltage should be no greater than 25 volts, but no less than 6 volts.

Figure 4:
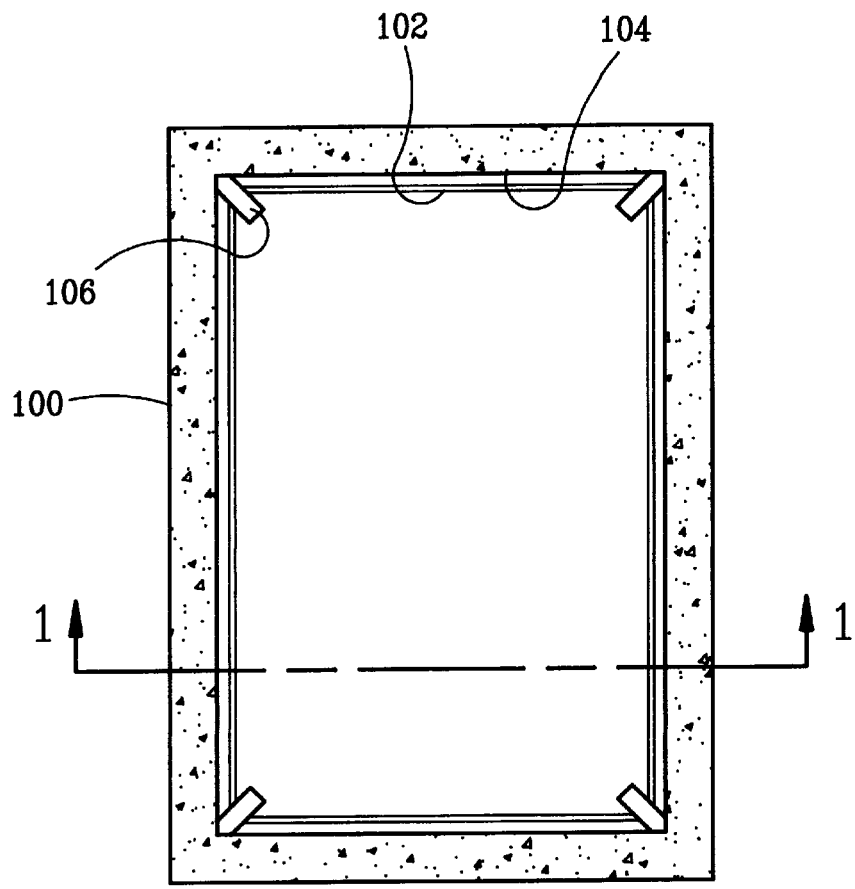
FIG. 4 is a top plan view of a tank in which an electric field generating system has been installed in accordance with a second preferred embodiment of the present invention.
Figure 5:
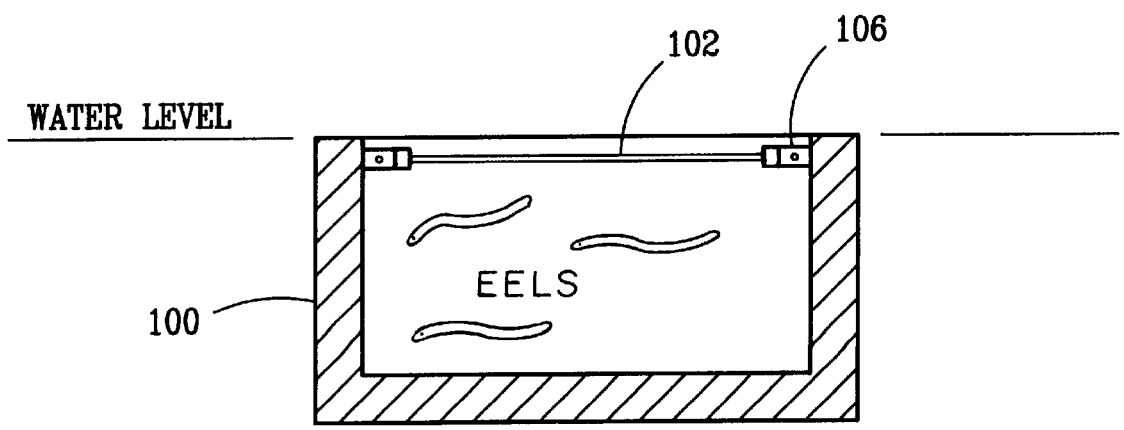
FIG. 5 is a section taken along line 1—1 of FIG. 4.

FIGS. 4 and 5 illustrate a second preferred embodiment of the invention in which low level electric fields are employed to contain fish or eels in an open vessel tank 100. In this embodiment, a training wire 102 is disposed around the inner wall 104 of the tank 100 at a position approximately 1 inch beneath the surface of the water, and spaced by a plurality of insulating stand-offs 106 approximately 1 inch from the inner wall 104 of the tank 100. A low voltage is applied across the training wire 102 and the tank wall using the energizer circuit 50 of FIG. 3. In experiments with eels that are known to routinely pass over barriers as high as 12 inches, the resulting electric field is successful at discouraging this behavior without stunning the eels, or causing any other deleterious effects. This is evidenced by a group of eels which have been exposed to, and contained by fields, for up to four months without harm, this outdoor experiment only being terminated due to winter conditions. In this embodiment of the invention, it was found that a maximum voltage of only 6 volts AC, or 12 volts DC, was required to keep the eels in the tank 100. It should be noted that voltages substantially higher than 8 volts AC, for example, should not be employed because the resulting field has a tendency to agitate the eels so much that they end up passing out of the tank, in spite of the field barrier. Presumably, the lower required voltage is a result of the closer proximity of the training wire 102 to the tank wall.

In conclusion, the present invention provides an improved technique for directing, repelling, trapping and/or containing fish, such as eels, which is effective and will not harm the fish, other wildlife or people. Although the invention has been disclosed in terms of a number of preferred embodiments, it will be understood that numerous variations and modifications could be made thereto without departing from the scope of the invention as set forth in the following claims.

What is claimed is:

1. A method for directing movement of fish in a body of water comprising the steps of:
   a) providing an open vessel, said vessel holding a body of water containing fish whose movement is to be directed;
   b) providing an electric field generating means comprising a first conductor wire submerged in said body of water and spaced from an inner wall of said vessel near a top of said vessel, and a power supply electrically connected to said conductor wire; and
   c) applying an electric potential of either 12 volts DC or less, or 8 volts AC or less, to said conductor wire with said power supply, said potential being selected to have a magnitude which repels said fish without stunning them, to thereby direct movement of said fish in a desired direction generally parallel to said conductor wire along lines of equal potential, and to limit a minimum approach distance of said fish to said conductor wire, whereby said field discourages fish in said vessel from exiting said vessel.

2. The method of claim 1, wherein said power supply is selected to be a current limiting power supply with a maximum current output of no more than 500 mA.

3. The method of claim 1, further comprising the steps of providing an impedance sensor in said body of water, and employing a signal generated by said sensor for automatically adjusting said power supply.

4. The method of claim 1, wherein said conductor wire is spaced approximately 1 inch from said inner wall.

5. An apparatus for directing movement of fish in a body of water, said apparatus comprising:
   a) an open vessel, said vessel holding a body of water containing fish whose movement is to be directed, said vessel including an inner wall;
   b) a first conductor wire submerged in said body of water and spaced from said inner wall of said vessel near a top of said vessel, and,
   c) a power supply electrically connected to said conductor wire for applying an electric potential of either 12 volts DC or less, or 8 volts AC or less, to said conductor wire with said power supply, said potential being selected to have a magnitude which repels said fish without stunning them, to thereby direct movement of said fish in a desired direction generally parallel to said conductor wire along lines of equal potential, and to limit a minimum approach distance of said fish to said conductor wire, whereby said field discourages fish in said vessel from exiting said vessel.

6. The apparatus of claim 5, wherein said power supply is a current limiting power supply with a maximum current output of no more than 500 mA.

7. The apparatus of claim 5, further comprising an impedance sensor disposed in said body of water for generating an impedance responsive signal for automatically adjusting said power supply.

8. The apparatus of claim 5, wherein said conductor wire is spaced approximately 1 inch from said inner wall.

* * * * *